United States Patent [19]

Lieberman

[11] Patent Number: 5,802,064
[45] Date of Patent: Sep. 1, 1998

[54] PROTOCOL HEADER ALIGNMENT

[75] Inventor: Bruce L. Lieberman, Los Altos, Calif.

[73] Assignee: Starlight Networks, Inc., Mountain View, Calif.

[21] Appl. No.: 616,104

[22] Filed: Mar. 14, 1996

[51] Int. Cl.$^6$ .................................................. H04J 3/16
[52] U.S. Cl. ........................ 370/469; 370/474; 370/505; 395/200.6
[58] Field of Search .................................... 370/469, 474, 370/505, 506, 523, 472, 470, 476, 471; 395/200.6, 200.61, 200.62

[56] References Cited

U.S. PATENT DOCUMENTS

| | | | |
|---|---|---|---|
| 5,058,110 | 10/1991 | Beach et al. | 370/469 |
| 5,448,566 | 9/1995 | Richtet et al. | 370/469 |
| 5,566,170 | 10/1996 | Bakke et al. | 370/474 |
| 5,598,410 | 1/1997 | Stone | 370/469 |

*Primary Examiner*—Hassan Kizou
*Assistant Examiner*—A. Bnimoussa
*Attorney, Agent, or Firm*—Meltzer, Lippe, Goldstein, et al.

[57] ABSTRACT

The present invention provides a method for achieving alignment of the header fields of a specific layer, such as the transport layer header fields, at a receiving host. The receiving host determines a number of padding bytes that need to be added to the transport layer header for the fields to be properly aligned in the memory of the receiving host. This number is determined dynamically for each connection because different connections require different numbers of padding bytes. The number of padding bytes for a connection is determined by the receiving host from the first packet received for a particular connection. Specifically, the receiving host examines this first packet and determines the position of the first byte of the transport layer protocol header, and therefore, the number of padding bytes required to achieve 32-bit (or 64 bit) alignment. The receiving host communicates the number of padding bytes to the transmitting host. The transmitting host then adds the specified number of padding bytes to the beginning of the transport layer header for the subsequently transmitted packets for this connection. The format of the padding bytes is such that when the receiving host reads a packet it can determine from the first padding byte how many padding bytes are in the packet, and therefore, how many bytes to skip over.

10 Claims, 6 Drawing Sheets

X = DON'T CARE

FORMAT OF PACKET WITH PADDING BYTES

PROTOCOL HEADER ALIGNMENT

FIELD OF THE INVENTION

The present invention relates to a method for achieving dynamic transport protocol field alignment to optimize performance of a receiving host in a network.

BACKGROUND OF THE INVENTION

An internet communications network 100 is depicted in FIG. 1 including five transit or backbone networks A, B, C, D, and E and three stub networks R, Y, and Z. A "backbone" network is an intermediary network which conveys communicated data from one network to another network. A "stub" network is a terminal or endpoint network from which communicated data may only initially originate or ultimately be received. Each network, such as the stub network R, includes one or more interconnected subnetworks I, J, L and M. As used herein, the term "subnetwork" refers to a collection of one or more nodes, e.g., (d), (a), (b, x, y), (q, v), (r, z), (s, u), (e, f, g), (h, i)), (j, k, l), (m, n), and (o, p) interconnected by wires and switches for local intemodal communication. Each subnetwork may be a local area network or LAN. Each subnetwork has one or more interconnected nodes which may be host computers ("hosts") u, v, w, x, y, z or routers a, b, c, d, e, f, g, h, i, j, k, l, m, n, o, p, q, r, s. A host is an endpoint node from which communicated data may initially originate or ultimately be received. A router is a node which serves solely as an intermediary node between two other nodes; the router receives communicated data from one node and retransmits the data to another node. Collectively, backbone networks, stub networks, subnetworks and nodes are referred to herein as a communications network.

FIG. 2 illustrates a host in the network of FIG. 1, which host receives packets from a transmitting host. Illustratively, the host 200 of FIG. 2 comprises a bus 202 to which are connected a CPU 204, a network interface 206, and a memory 208. Packets arrive a the host 200 from the network 100 via the network interface 206. The format of packet is shown in FIG. 3.

In general, the packet 300 of FIG. 3 has a physical layer header 302, a network layer header 304, a transport layer protocol header 306, and a field 308 for user data. The physical layer header 302 may be a MAC header, the network layer header 304 may be an Internet Protocol (IP) header, and the transport layer header may be an XTP header. Illustratively, the user data is full motion video data.

Physical layer processing of each packet arriving from the network 100 takes place in the network interface 206. Then the packets are transferred to the memory 208. More specifically, a virtual queue or virtual buffer 209 is defined in the memory 208. The arriving packets are queued in the virtual buffer 209 for further processing.

In the case of video applications, the transmitting host in the network may be a video server and the receiving host may be a client. Full motion video applications in the network place heavy performance demands on the video server and video client. Performance is noticeably affected by the per packet protocol processing. Writing the protocol fields of each packet into memory and reading these fields from memory contribute to these significant performance demands.

Video applications tend to use transport protocols (such as MTP and RTP) whose headers have many 32-bit fields. Video applications generally run on 32 bit machines. For example, the host 200 of FIG. 2 has a bus 202 which is 32-bits wide and the processor 204 performs operations on words having a length of 32-bits (i.e., four bytes).

Such 32-bit machines pay a penalty for accessing 32-bit fields that are not 32-bit aligned in memory. Because different MAC layer headers have different lengths, it is not possible to guarantee that a network layer header or a transport layer header of a packet used for a video application will have its 32-bit fields optimally aligned in the memory of the receiving host.

This is not usually a problem on a host that transmits packets. Such a machine can create a packet and place it into a buffer in such a way that the transport layer header is correctly aligned. Hosts that receive packets, such as the host 200 of FIG. 2, are not so lucky. The alignment of the transport layer protocol header in the memory of the receiving host is a matter of chance.

The alignment problem at the receiving host (e.g. the host 200 of FIG. 2) may be more clearly understood in connection with FIG. 4 and FIG. 5. FIG. 4 shows the buffer 209 defined in the memory 208 of the host 200 in greater detail. The buffer 208 comprises a plurality of four bit storage locations 221-1, 221-2, . . . , 221-p, 221-p+1, etc. Each storage location stores a 32-bit (four byte) word. Each storage location has an address designated $A_1, A_2, \ldots, A_p$, $A_{p+1}$, etc. In FIG. 4, a packet comprising a MAC header 302, an IP header 304, a transport protocol layer header 306 and a user data field 308 is shown as being stored in the buffer 209. In particular, the transport layer header is shown as comprising a plurality of 32-bit fields designated field-1, field-2, . . . , field-n. In FIG. 4, the transport layer header is 32-bit aligned. Each 32-bit field is contained within one 32-bit storage location. For example, field-1 is stored at address $A_p$ and field-2 is stored at address $A_{p+1}$.

FIG. 5 illustrates the situation when the transport layer header is not 32-bit aligned. In this case, three bytes from field-1 are stored at address $A_p$ and one byte from field-1 is stored at address $A_{p+1}$. Similarly, three bytes from field-2 are stored at address $A_{p+1}$ and one byte from field-2 is stored at address $A_{p+2}$. This is very inefficient because to access one field in the transport layer header, the CPU must execute two read operations as well as several additional CPU instructions (which instructions must first be retrieved from memory).

It should be noted that his alignment problem can arise for word sizes other than 32-bit such as a 64-bit word size and for any header that follows a non-word aligned header.

The prior art has not satisfactorily addressed this alignment problem. The XTP transport protocol provides a mechanism for aligning user data (the bytes that follow the transport layer header as shown in FIG. 2). This mechanism allows for the alignment of user data in the memory of the transmitting host. It does not guarantee alignment of the user data in the memory of the receiving host. The XTP protocol has no mechanism for enabling the receiving host to cause the transmitting host to alter the alignment of the user data to meet the needs of the receiving host.

The usual approach for handling misalignment of the transport layer header at the receiving host is to do nothing. The receiving host receives packets and reads the transport layer header fields as best it can. This may mean performing a series of resource intensive operations such as memory reads, arithmetic masks and addition of partial results.

Another possible but inefficient solution is to copy the transport layer header fields into a separate temporary buffer that is properly aligned. This reduces the execution of arithmetic operations but still requires extra memory reads and writes.

Accordingly, in view of the foregoing, it is an object of the present invention to provide a mechanism for achieving dynamic header field alignment at a receiving host to optimize performance of the receiving host, especially for video applications.

SUMMARY OF THE INVENTION

The present invention provides a method for achieving alignment of the header fields, for example, transport layer header fields, at a receiving host. The receiving host determines a number of padding bytes that need to be added to the transport layer header for the fields to be properly aligned in the memory of the receiving host. This number is determined dynamically for each connection because different connections require different numbers of padding bytes. The number of padding bytes for a connection is determined by the receiving host from the first packet received for a particular connection. Specifically, the receiving host examines this first packet and determines the position of the first byte of the transport layer protocol header, and therefore, the number of padding bytes required to achieve 32-bit (or 64 bit) alignment. The receiving host communicates the number of padding bytes to the transmitting host. The transmitting host then adds the specified number of padding bytes to the beginning of the transport layer header for the subsequently transmitted packets for this connection. The format of the padding bytes is such that when the receiving host reads a packet it can determine from the first padding byte how many padding bytes are in the packet, and therefore, how many bytes to skip over in order to get to the transport protocol header.

Although illustrated above in the context of a non-word aligned transport layer header, the present invention, illustratively, can be used align any header.

DETAILED DESCRIPTION OF THE INVENTION

Figure 1:
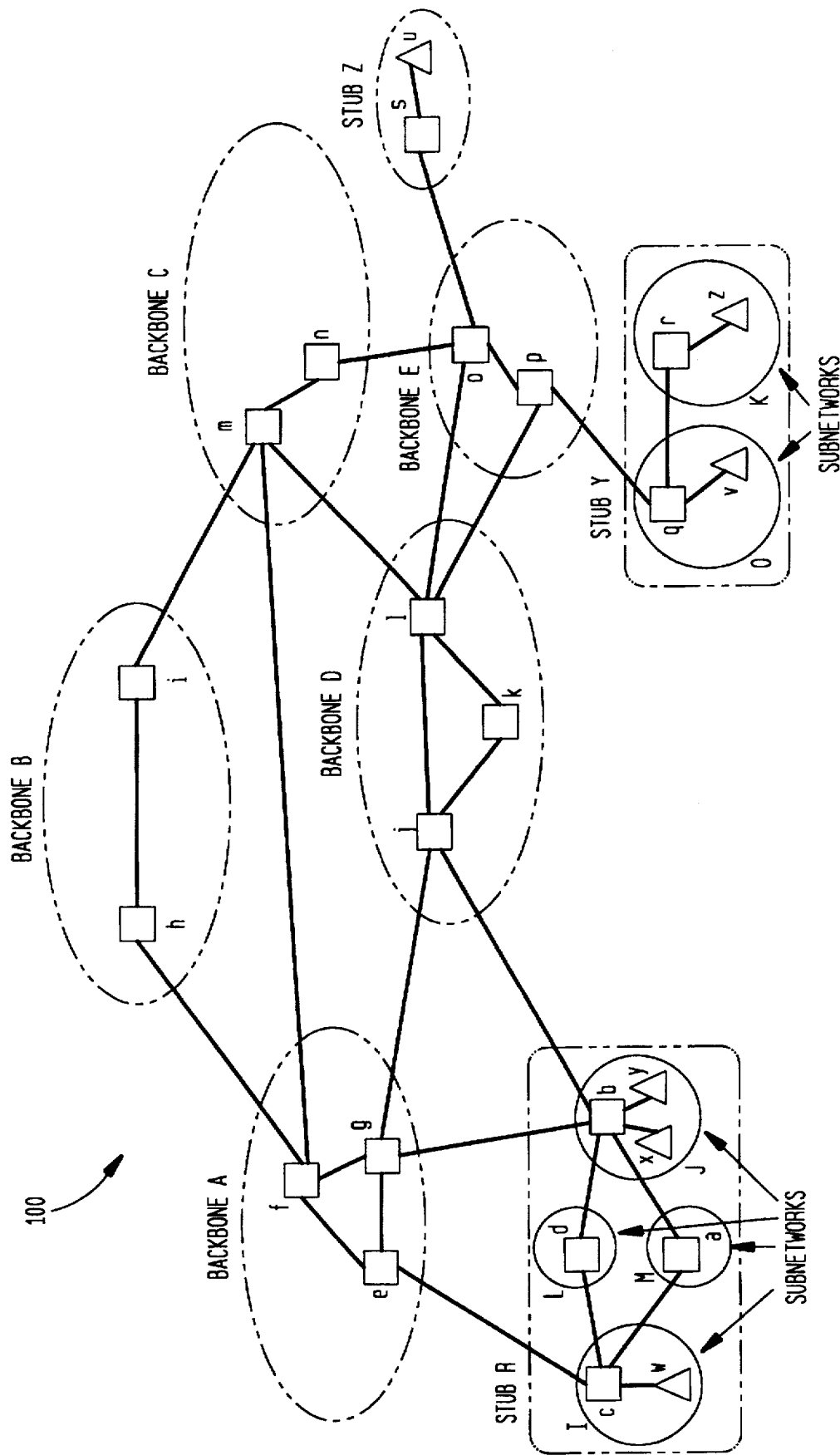
FIG. 1 illustrates a communications network.
Figure 2:
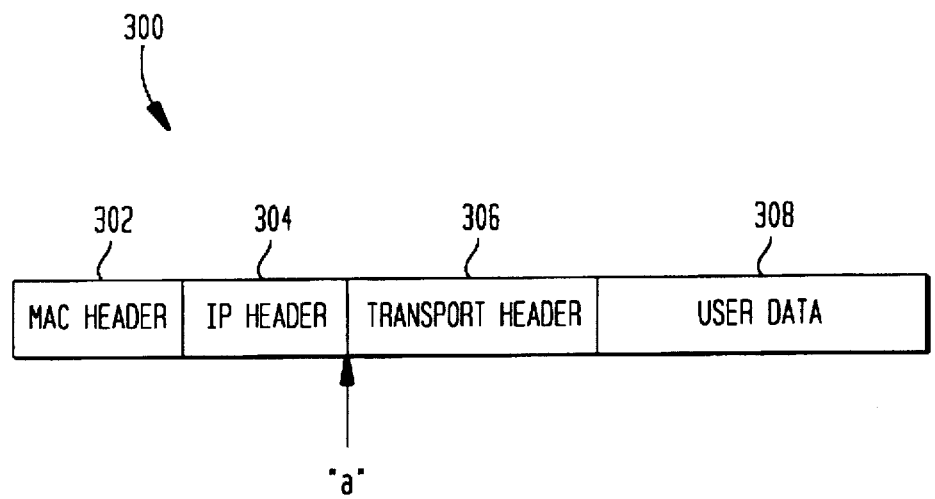
FIG. 2 illustrates the format of a packet transmitted from a transmitting host to a receiving host in the network of FIG. 1.
Figure 3:
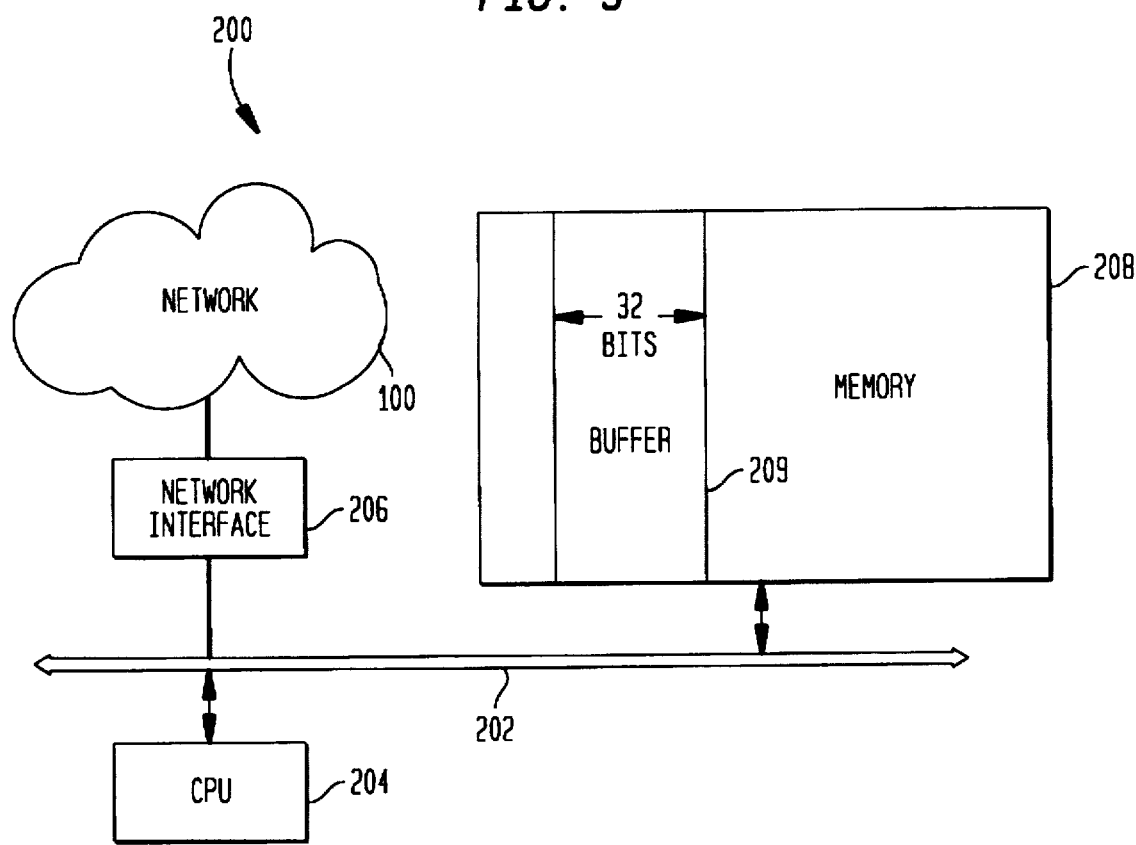
FIG. 3 illustrates a receiving host in the network of FIG. 1.
Figure 4:
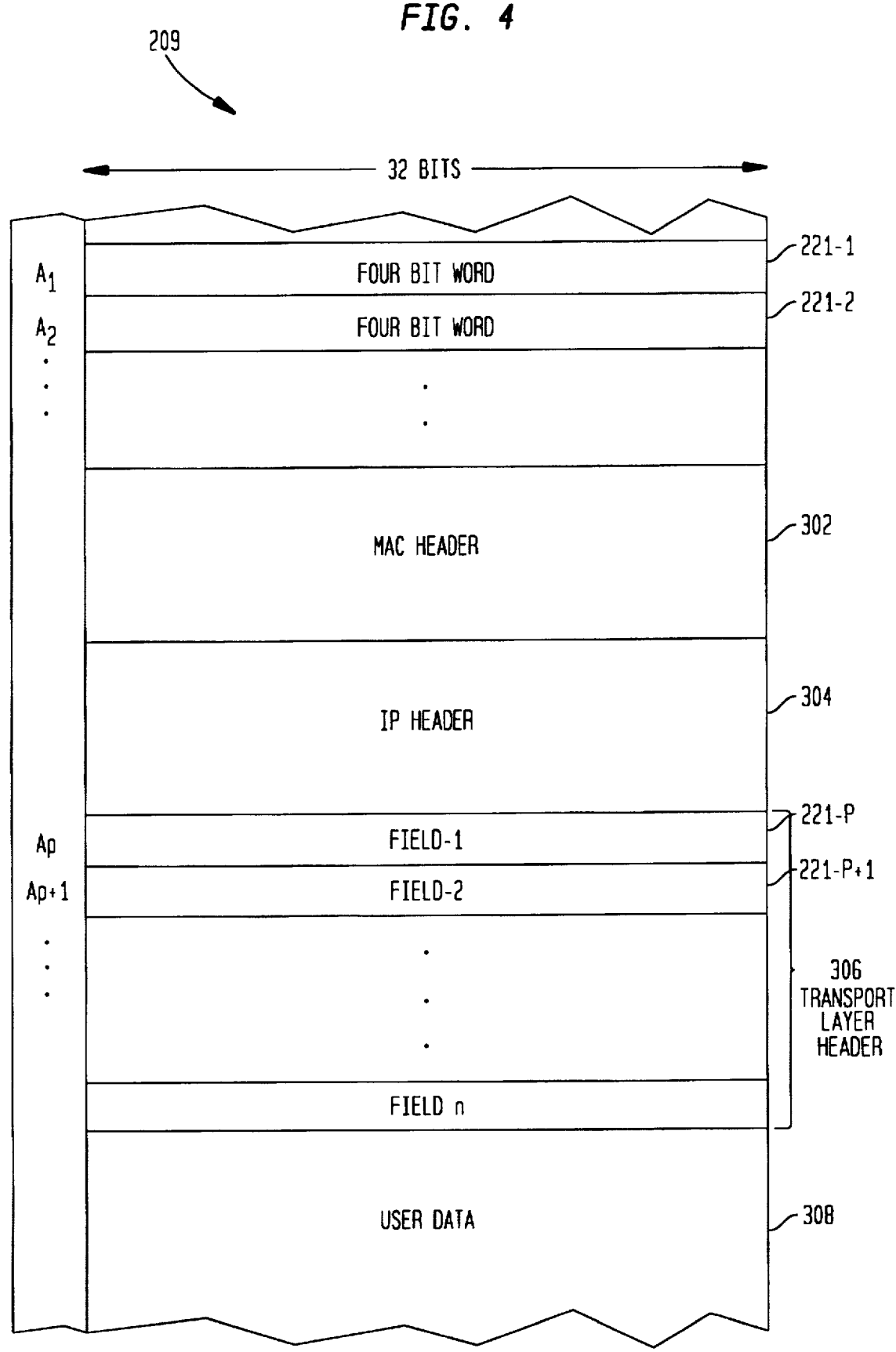
FIG. 4 illustrates the storage of a packet in a queue in the memory of the receiving host of FIG. 3, when the transport layer header fields are properly aligned.

In accordance with the present invention, a transmitting host adds a specified number of padding bytes to the header of a specific layer of each packet belonging to a particular connection that is transmitted from the transmitting host to the receiving host. For purposes of illustration, the packet structure of FIG. 2 is used and it is assumed that the transport layer header is to be word aligned. However, the invention can be used to word-align a non-aligned header of any layer in a packet with a sequence of multiple headers. The number of padding bytes to be added to each packet of a particular connection is determined by the receiving host after receiving the first packet of a particular connection. The number of padding bytes is determined so that the transport layer header is properly aligned in the memory of the receiving host.

The receiving host determines the number of padding bytes by examining the relative address of the start of the transport layer header in this first packet. For example, as shown in FIG. 2, the address of the first byte of the transport layer protocol header within the packet has the address "a". For 32-bit alignment, the number of padding bytes is given by (~a) and 3 where (~a) is the ones complement of the address "a".

For 64-bit alignment, the number of padding bytes is given by (~a) and 7

The number of padding bytes varies from one connection to another.

Once the receiving host determines the specified number of padding bytes, a message is sent from the receiving host to the transmitting host indicating this information.

The transmitting host then adds the specified number of padding bytes at the front of each transport layer header of each packet belonging to the particular connection.

Figure 6A:
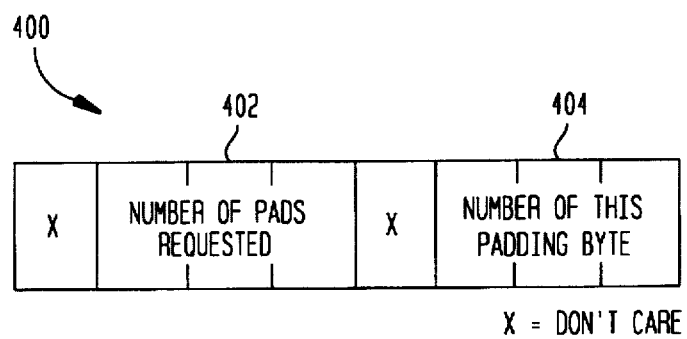
FIGS. 6A and 6B illustrate the format of a padding byte for use in the transport layer header, according to an illustrative embodiment of the invention.

FIG. 6A illustrates the first padding byte 400 placed in front of the transport layer header. The first padding byte 400 has a three bit field 402 which indicates the number of padding bytes requested for the packets of this connection. A second three bit field 404 indicates the number of this particular padding byte out of the total number of padding bytes requested for the packets of this connection. The symbol "x" means "don't care". A packet which requires zero padding bytes has a byte at the front of the transport layer header with the format of the byte 400 of FIG. 6A. This byte indicates that zero padding bytes are requested and that the number of this padding byte is zero.

Figure 6B:
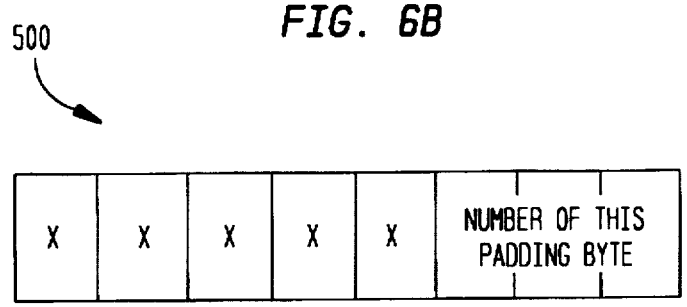

FIG. 6B indicates the format of a padding byte 500 which is other than the first padding byte. This byte only includes the three bit field 404 which indicates the number of this particular padding byte out of the total number of padding bytes requested for the packets of this connection.

Figure 5:
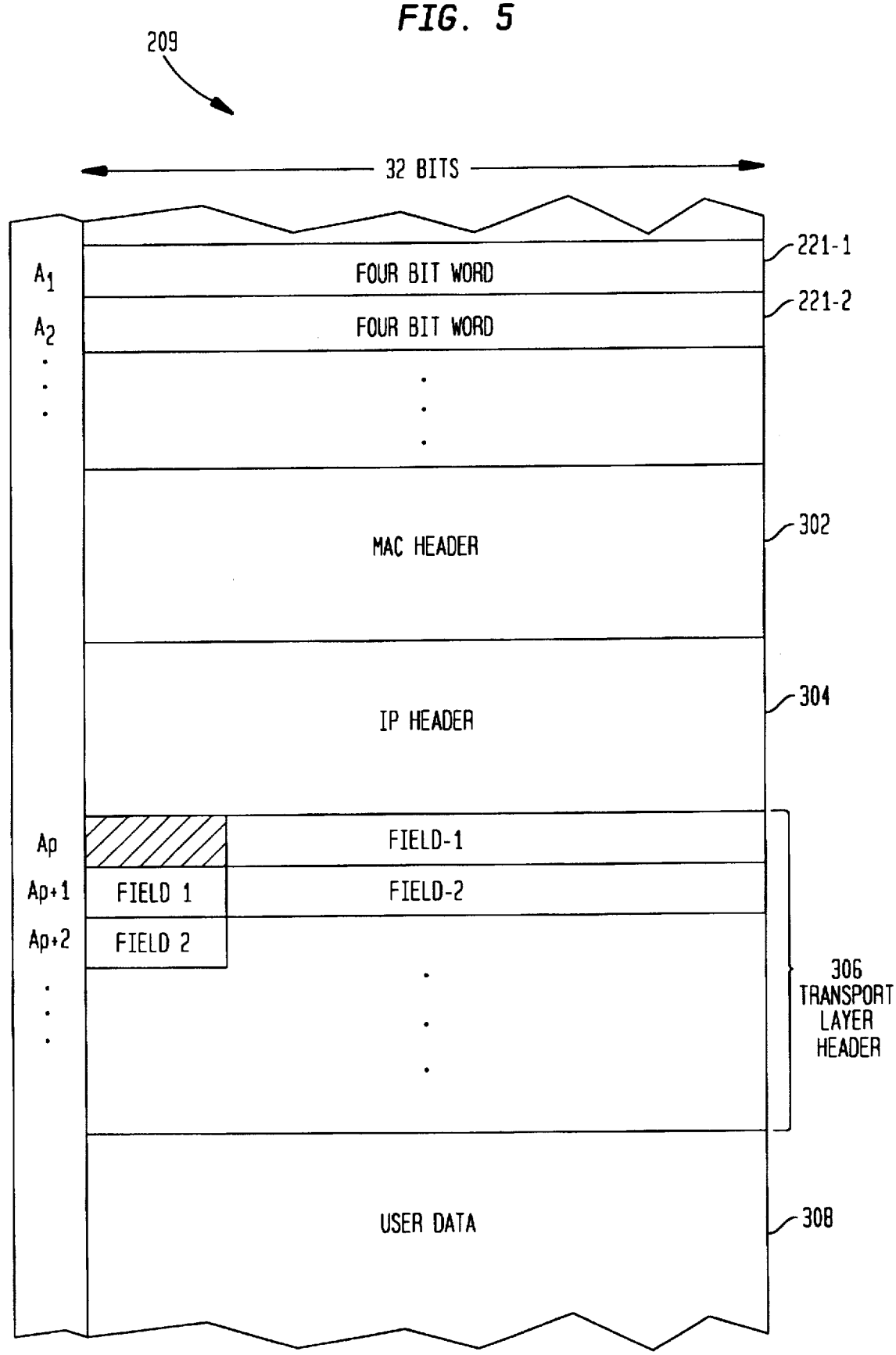
FIG. 5 illustrates the storage of a packet in a queue in the memory of the receiving host of FIG. 3, when the transport layer header fields are not properly aligned.
Figure 7:
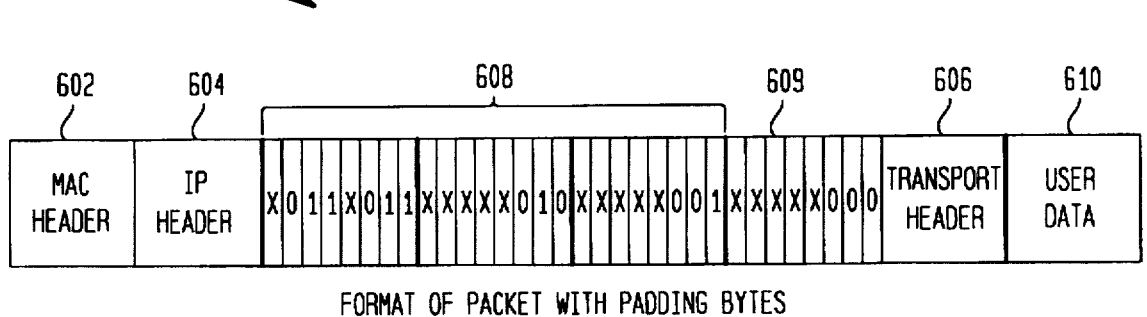
FIG. 7 illustrates a packet containing padding bytes, according to an illustrative embodiment of the invention.

FIG. 7 shows a packet 600 which has been formatted in accordance with an illustrative embodiment of the present invention. This packet has been formatted so as to solve this misalignment problem illustrated in FIG. 5. Thus, the packet 600 of FIG. 7 includes three padding bytes.

Specifically, the packet 600 of FIG. 7 includes a MAC header field 602, an IP header field 604, and a transport layer header field 606 including padding bytes 608. There is also a user data field 610 which contains full motion video data.

The packet 600 of FIG. 7 includes three padding bytes 608. The first padding byte has the format of FIG. 6A and indicates three padding bytes have been requested for this connection. It is desirable to indicate the number of requested padding bytes in the first padding byte of the transport layer header of each packet because this tells the receiving host how many padding bytes it can skip over when reading the transport layer header.

The second and third padding bytes have the format of FIG. 6B. The byte 609 maybe viewed as part of the transport header and not as a padding byte. Even a packet which requires no padding bytes has a byte which indicates that there is no padding byte. This byte is actually the first byte of the transport protocol header field. If the protocol does not support this usage of its first byte, then the number of padding bytes is always one or greater. If the header is already aligned, then four bytes of padding is used.

Figure 8:
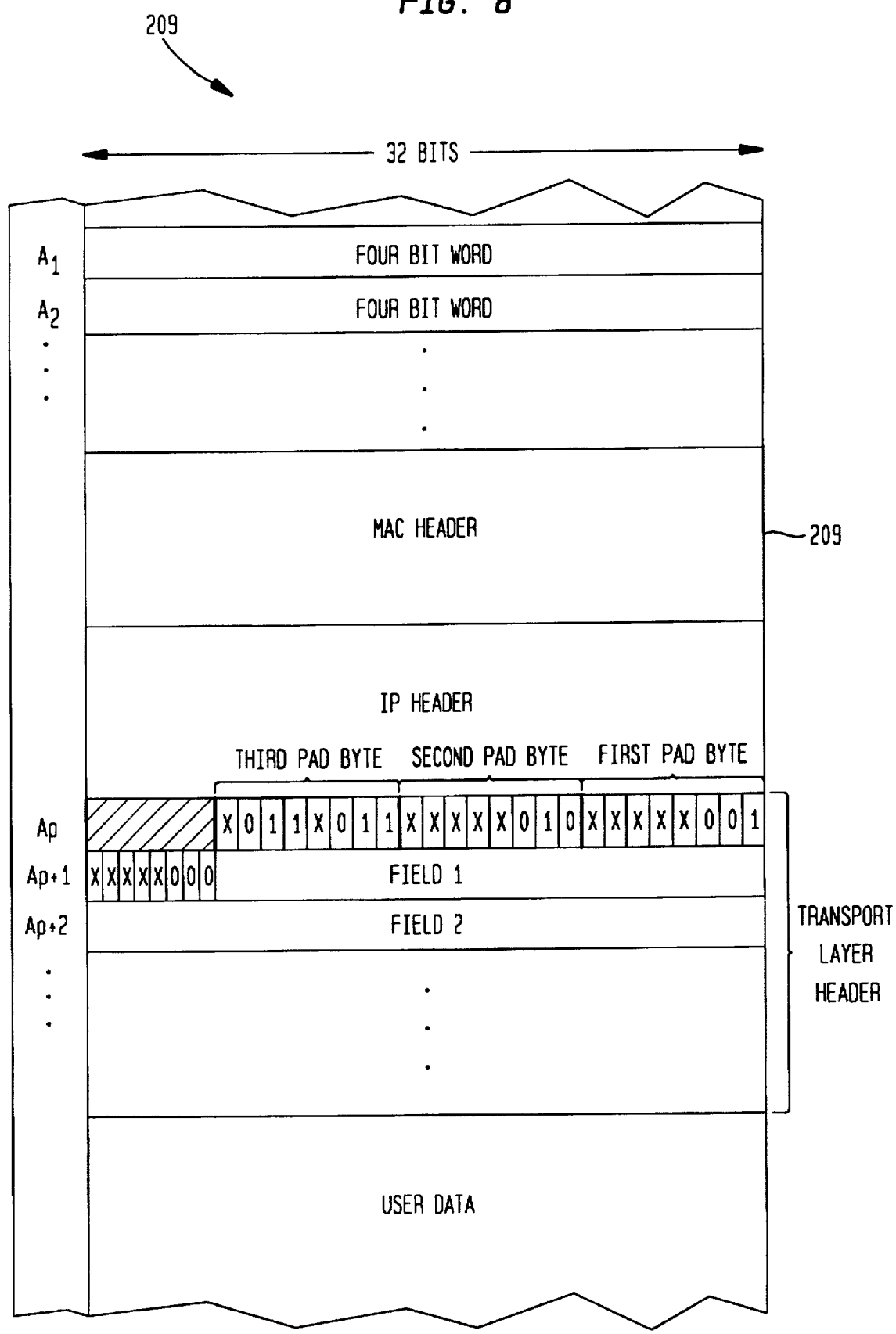
FIG. 8 illustrates the storage of the packet of FIG. 7 in a queue in the memory of a receiving host.

FIG. 8 illustrates the packet 600 of FIG. 7 after it has been placed in the queue 209 of the receiving host 200. It can be seen that all fields of the transport header are 32-bit aligned. Each field can be accessed by accessing only one four-byte (32-bit) word address of the queue.

Finally, the above-described embodiments of the invention are intended to be illustrative only. Numerous alternative embodiments may be devised by those skilled in the art without departing from the following claims.

I claim:

1. A method for transmitting properly aligned packets from a transmitting host to a receiving host in a network, wherein said receiving host determines a sequence for properly aligning said packets and said transmitting host implements said sequence, said packets having a physical layer header, a network layer header, a transport layer header, and user data, said method comprising the steps of:

(1) receiving at said receiving host a particular packet for a particular connection;

(2) at said receiving host, determining from said particular packet a number of padding bytes required to be added to the transport layer headers of subsequent packets belonging to said connection, such that the transport layer headers in said subsequent packets are properly aligned in a queue defined in a memory of said receiving host;

(3) transmitting said number of padding bytes from said receiving host to said transmitting host; and (4) at said transmitting host, inserting said number of padding bytes at the beginning of the transport layer header of each packet belonging to said connection which is subsequently transmitted to said receiving host.

2. The method of claim 1 wherein said padding bytes have a format which indicates to said receiving host how many bytes are to be skipped when the transport layer header of one of said packets is being read from said queue in said receiving host.

3. The method of claim 1 wherein said user data includes full motion video data.

4. A method for transmitting full motion video data from a transmitting host to a receiving host in a communications network, said method comprising the steps of:

(1) at said transmitting host, organizing said full motion video data into packets, each packet having a physical layer header, a network layer header, a transport layer header, and a user data field containing full motion video data, said transport layer header including at the start thereof a number of padding bytes determined by said receiving host and communicated via said network to said transmitting host, so that when the packets are transmitted via said network and received into a queue at said receiving host, the transport layer headers of said packets have a desired alignment in said queue, and (2) transmitting said packets from said transmitting host via said network to said receiving host.

5. A method for receiving and processing properly aligned packets at a receiving host in a network comprising the steps of:

(1) receiving said packets from said network at said receiving host, each of said packets having a transport layer header including a specified number of padding bytes determined by said receiving host separately for separate connections and transmitted to a transmitting host which transmits the packets;

(2) writing said packets into a queue defined in said memory at said receiving host, said specified number of padding bytes causing said transport layer headers of said of packets to have a desired alignment in said queue; and (3) reading said packets from said queue by skipping over said specified number of bytes at the start of each of said transport layer headers.

6. The method of claim 5 wherein said packets include full motion video data.

7. A method for transmitting packets from a transmitting host to a receiving host in a network, wherein said receiving host determines a sequence for properly aligning said packets and said transmitting host implements said sequence, said packets having a contiguous sequence of headers, including a first header followed by a second header, and user data, said method comprising the steps of:

(1) receiving at said receiving host a particular packet for a particular connection;

(2) at said receiving host, determining from said particular packet a number of padding bytes required to be added to said second header of subsequent packets belonging to said connection by said receiving host and communicated via said network to said transmitting host, such that said second headers in said subsequent packets are properly aligned in a queue defined in a memory of said receiving host;

(3) transmitting said number of padding bytes from said receiving host to said transmitting host; and (4) at said transmitting host, inserting said number of padding bytes at the beginning of said second header of each packet belonging to said connection which is subsequently transmitted to said receiving host.

8. The method of claim 7 wherein said padding bytes have a format which indicates to said receiving host how many bytes are to be skipped when the second header of one of said packets is being read from said queue in said receiving host.

9. The method of claim 1 wherein said user data includes full motion video data.

10. A method for transmitting full motion video data from a transmitting host to a receiving host in a communications network, said method comprising the steps of:

(1) at said transmitting host, organizing said fill motion video data into packets, each packet having a contiguous sequence of headers, including at least a first header followed by a second header, and a user data field containing full motion video data, said second header including at the start thereof a number of padding bytes determined by said receiving host and communicated via said network to said transmitting host, so that when the packets are transmitted via said network and received into a queue at said receiving host, the said second headers of said packets have a desired alignment in said queue, and (2) transmitting said packets from said transmitting host via said network to said receiving host.

\* \* \* \* \*